US008013949B2

(12) United States Patent  
Class-Dieter et al.

(10) Patent No.: US 8,013,949 B2  
(45) Date of Patent: Sep. 6, 2011

(54) LIQUID CRYSTAL DISPLAY DEVICE WITH OPTOELECTRONIC COMPONENT AND METHOD FOR CONTROLLING BACKLIGHTING OF SUCH A DISPLAY DEVICE

(75) Inventors: Klaus Class-Dieter, Sinzing (DE); Robert Eckmüller, Ringelai (DE); Johannes Kraus, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 553 days.

(21) Appl. No.: 10/439,769

(22) Filed: May 16, 2003

(65) Prior Publication Data

US 2003/0197817 A1  Oct. 23, 2003

Related U.S. Application Data

(63) Continuation of application No. PCT/DE01/00772, filed on Mar. 1, 2001.

(30) Foreign Application Priority Data

Nov. 21, 2000  (DE) .................................. 100 57 696

(51) Int. Cl.  
*G02F 1/1335* (2006.01)

(52) U.S. Cl. ......................................................... 349/61

(58) Field of Classification Search .................... 349/69, 349/70, 114, 60–65  
See application file for complete search history.

(56) References Cited

U.S. PATENT DOCUMENTS

| 4,655,552 | A | * | 4/1987 | Togashi et al. ................... 349/24 |
| 4,759,610 | A | * | 7/1988 | Yanagisawa ................... 349/162 |
| 4,760,389 | A |   | 7/1988 | Aoki et al. ...................... 340/719 |
| 5,153,420 | A | * | 10/1992 | Hack et al. ................... 250/208.1 |
| 5,386,543 | A | * | 1/1995 | Bird .................................. 358/1.1 |
| 5,610,629 | A | * | 3/1997 | Baur .............................. 345/104 |
| 5,684,294 | A | * | 11/1997 | Kouhi ...................... 250/214 AL |
| 5,724,108 | A | * | 3/1998 | Shibata ............................. 349/62 |
| 5,818,553 | A | * | 10/1998 | Koenck et al. ................... 349/61 |
| 5,933,089 | A |   | 8/1999 | Katada ....................... 340/825.44 |
| 6,034,752 | A | * | 3/2000 | Khan et al. ....................... 349/74 |
| 6,069,676 | A | * | 5/2000 | Yuyama .......................... 349/62 |
| 6,188,380 | B1 | * | 2/2001 | Kawashima et al. .......... 345/102 |
| 6,255,784 | B1 | * | 7/2001 | Weindorf ....................... 315/291 |
| 6,831,710 | B2 | * | 12/2004 | den Boer ........................ 349/48 |
| 6,888,528 | B2 | * | 5/2005 | Rai et al. ....................... 345/102 |

FOREIGN PATENT DOCUMENTS

DE  41 40 647 A1  6/1993

* cited by examiner

*Primary Examiner* — Timothy Rude  
(74) *Attorney, Agent, or Firm* — King & Spalding L.L.P.

(57) ABSTRACT

An LC display is disclosed that comprises a light source (5) that provides the background illumination, that emits light of only a part of the spectrum and that is disposed on the back (9) of the liquid crystal layer (10) so as to be protected and covered while it still is able to detect or emit light through the liquid crystal layer (10). The detected light is evaluated to control the background illumination and the inventive device enables data communication with an external device.

11 Claims, 4 Drawing Sheets

LIQUID CRYSTAL DISPLAY DEVICE WITH OPTOELECTRONIC COMPONENT AND METHOD FOR CONTROLLING BACKLIGHTING OF SUCH A DISPLAY DEVICE

CROSS-REFERENCE TO RELATED APPLICATION

This application is a continuation of co-pending International Application No. PCT/DE01/00772 filed Mar. 1, 2001, which designates the United States, and claims priority to German application number DE 10057696.6 filed Nov. 21, 2000.

BACKGROUND OF THE INVENTION

The invention concerns an LC display with at least one optoelectronic component and a light source for backlighting of the display, as well as the method for controlling backlighting.

Control of backlighting in LC displays that have backlighting can occur as a function of the surrounding brightness. This is particularly advantageous in battery-operated equipment or portable equipment equipped with batteries, since the energy consumption of backlighting is very high. In order to permit expedient control of backlighting, a light sensor, generally a photodiode, must, if possible, accurately measure the light intensity of the surrounding light falling on the display. Suitable arrangement of the sensor is problematical precisely in small devices. In particular, unintended shading, for example, by the hands of the user, must be avoided. Similar problems occur in infrared sensors for receiving signals of an electronic device (for example, remote control), which are often also arranged in the vicinity of the display.

SUMMARY OF THE INVENTION

One objective of the invention is to furnish an LC display and a method for backlighting of an LC display, in which an optoelectronic component is accommodated in space-saving fashion and protected from shading.

This objective can be achieved with an LC display with at least one optoelectronic component comprising at least one liquid crystal layer, a light source for backlighting of the LC display that is arranged on one side of at least one liquid crystal layer, facing away from the viewer, and at least one optoelectronic component arranged on the side of at least one liquid crystal layer, facing away from the viewer, for detection or emission of light through the liquid crystal layer.

The LC display may further comprise a control device connected to the optoelectronic component that controls the power of light source as a function of the light intensity of the surrounding light impinging on the optoelectronic component. The control device may correct the intensity measured by the optoelectronic component with a value determined from control of the light source. The light source can emit only part of the spectrum, and that the optoelectronic component is aligned to that spectrum that is not emitted by light source. The LC display may further comprise a filter for the light source that filters out the spectrum, for which the at least one optoelectronic component is designed. The optoelectronic component can be an infrared sensor or an infrared transmitter for data communication with an external device. The optoelectronic component can be designed for operation in the non-visible spectral region. The optoelectronic component can be designed for operation of the spectral region between 900 and 1100 nm. The LC display can be a transflective display or a transmissive display. The at least one optoelectronic component can be arranged on one surface of the fiber-optic light guide. The at least one sensor can be arranged on one surface of a reflector. The at least one optoelectronic component can be arranged parallel to light source.

This objective can further be achieved with a method for controlling backlighting of an LC display with at least one liquid crystal layer comprising the steps:

determining the intensity of the surrounding radiation on the side of the LC display, on which a light source is arranged to backlight the display, controlling the power of light source as a function of the intensity of the surrounding radiation.

An optoelectronic component may selectively measure only part of the spectrum that is not emitted by the light source, in order to determine the intensity of the surrounding light. Only the intensity in the non-visible spectral region of the electromagnetic radiation can be measured. The radiation can be measured in the spectral region between 900 nm and 1100 nm.

By arranging the optoelectronic component behind the liquid crystal layer of the display, the optoelectronic component is well protected and covered, but nevertheless can sense the incident light and therefore detect the intensity of the light or transmitted signals. The optoelectronic components can also optionally send signals through the liquid crystal layer to an external device. The infrared spectrum is particularly suitable for data exchange between an electronic device connected to the display and an external device.

The invention is particularly suited for determination of light intensity of the surrounding light, in order to control backlighting of a liquid crystal display.

Measurement of the light intensity and exchange of data by means of the optoelectronic component can be produced alternately or simultaneously in a display according to the invention. If both functions are to be implemented, this can alternately occur with the same optoelectronic component or with different optoelectronic components that are also preferably arranged behind the display.

The intensity of the surrounding light can be determined by measuring its entire spectrum (100 nm to 1 mm) or by selectively measuring parts of the spectrum of the surrounding light.

As an alternative, it is possible to draw conclusions concerning the light intensity for controlling the light source by determining a fraction of the surrounding light in the total measured light. With the calculated light intensity of the light source, the value of the light intensity measured by the sensor, which originates from the surrounding light and the light source, can be corrected. Ordinary control devices or microcontrollers are suitable for the required calculations.

By arranging the optoelectronic component or optoelectronic components at a location that is situated behind the liquid crystal layers relative to a viewer of the display, the light incidence from the surroundings on the liquid crystal layer can be exactly measured. Inadvertent covering or shading of the optoelectronic component cannot occur.

In a preferred variant of the invention, it is kept in mind during measurement of the light intensity that the light originating from the backlighting is not considered. This can be achieved, for example, by using a filter in front of the light source or in front of the optoelectronic component. However, a sensor that selectively measures only part of the spectrum can also be used, especially that part that is not emitted by the backlighting.

Especially in the so-called negative mode LC displays, in which the information is displayed bright and the background dark, at least one optoelectronic component that is sensitive to the spectral range above 780 nm is used. Ordinarily, the pole filters employed in such displays absorb electromagnetic radiation in the visible region of the spectrum and in the UV region, but not in the infrared region. If a sensor that records visible light is used as optoelectronic component in a negative mode display, measurement of the light intensity therefore depends on how many segments are instantaneously controlled. On the other hand, light in the spectral region above 900 nm is almost not absorbed, so that measurement is particularly useful in this region.

Infrared sensors are particularly suitable for measurement of light intensity in negative mode LC displays, since backlighting with a cold cathode tube or with light diodes does not emit infrared radiation or no noticeable infrared radiation. Connection of a filter in front of the sensor or light source of the backlighting can therefore regularly be dispensed with. If the light intensity measurement is conducted in the near infrared region (900 nm to 1100 nm), small errors as a result of heat radiation can also occur. This region is also particularly usable for information transmission, since ordinary transmitters and receivers (sensors) operate in this wavelength region.

The invention is particularly suited for transmissive LC displays, i.e., displays that are to be operated only with backlighting, and for LC displays that reflect surrounding light and are additionally equipped with backlighting (transflective displays). Such transflective displays, as presented, for example, in the journal *Elektronik* 22/2000 on page 32, regularly require no backlighting in daylight. In principle, it makes no difference whether DSTN, TN-STN, FSTN, HAN, DAP, OMI or other LC displays are involved.

BRIEF DESCRIPTION OF THE DRAWINGS

Additional advantages, features and application possibilities of the invention are apparent from the description of practical examples in conjunction with the drawings. In the drawing.

DETAILED DESCRIPTION OF THE PREFERRED EMBODIMENTS

Figure 1:
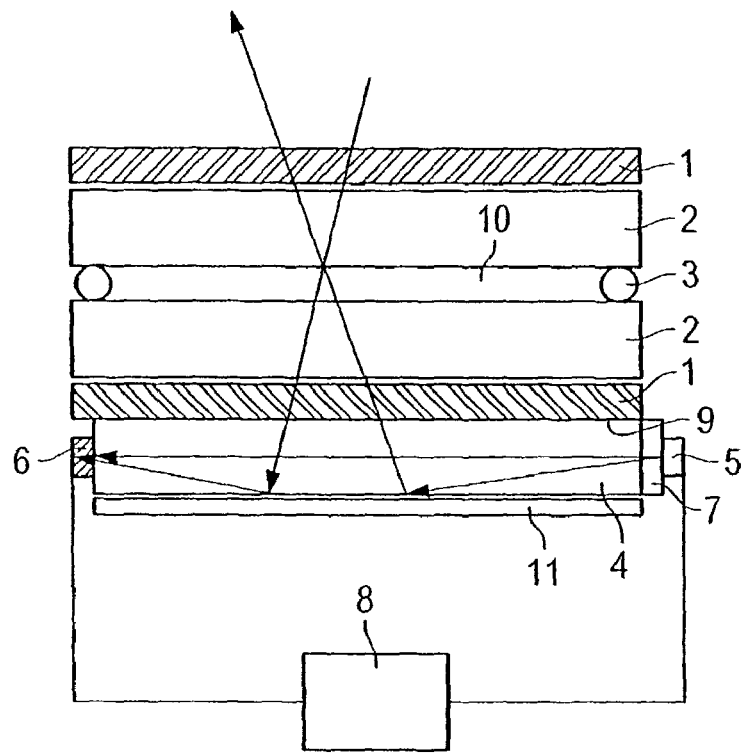
FIG. 1 shows a section through a transflective LC display with a light guide and reflector.

FIG. 1 shows a simple transflective LC display that reflects daylight or surrounding light and is additionally provided with backlighting. It has a front and rear pole filter 1, between which two parallel glass substrates 2 are arranged. A liquid crystal layer 10 is embedded between two glass substrates 2. The glass substrates 2 are connected to each other via a joining frame. The joining frame prevents emergence of the liquid crystal.

A light guide 4 is arranged on the rear pole filter 1 of the display. The light guide 4 is therefore situated on the backside or side 9 (backside) of the display facing away from a viewer. Light for backlighting of the display is coupled into the fiber-optic light guide 4 from a light source 5, just as incoming surrounding light is reflected in the direction of the viewer. For this purpose, the fiber-optic light guide 4 is provided with a reflector 11 on the side facing away from the glass substrate. The light source 5 is arranged parallel to the glass substrate 2 and emits light only of one part of the visible spectrum. Advantageously, it is a light source that furnishes monochromatic light.

An optoelectronic component 6 is arranged on one side of the fiber-optic light guide 4, which is aligned perpendicular to the glass substrate 2. The component 6 is aligned in an axis that essentially coincides with the radiation axis of light source 5. Component 6 is arranged in a plane parallel to the rear pole filter 1 and farther removed from the front pole filter than from the rear pole filter. A phototransistor, which can be used as a transmitter and/or receiver, a photodiode or another means of light measurement (CCD), is considered as optoelectronic component 6. Component 6 in this practical example is a photodiode that serves as sensor.

In the event that the light source emits in a spectral region that is measured by the optoelectronic component of sensor, a filter 7 that filters out the corresponding spectrum is arranged between light source 5 and fiber-optic light guide 4. Only those spectral components that originate from the incoming surrounding light, especially sunlight, are therefore measured by the sensor. This is schematically depicted by a light beam impinging on the light guide.

If filter 7 is to be dispensed with, as an alternative for controlling light source 5, its radiation intensity can be back-calculated, in order to determine the fraction of the radiation of surrounding light in the total measured radiation. This task can be assumed by control device 8, if control device 8 is a microcontroller that permits conclusions concerning the radiation intensity of light source 5 based on its power absorption or based on a control signal. The intensity calculated for light source 5 is then subtracted from the measured total intensity.

The sensor is arranged in the plane of the light source and therefore not visible to a viewer of the display. A housing opening for the sensor and insertion of electrical lines to the housing front drops out.

The optoelectronic component 6 is fully covered from the outside by a housing (not shown) and the LC display.

A control device 8, which is a microcontroller, controls the power of light source 5 based on the radiation intensity of the surrounding light measured in the region of fiber-optic light guide 4. With strong sunlight impinging on the LC display, the reflected surrounding light is sufficient for reading the display. With diminishing intensity of the surrounding light, a corresponding compensation occurs by light source 5.

By dimming the light source 5 according to the light intensity of the surrounding light impinging on the LC display, the energy consumption during daylight is significantly reduced. The readability remains good in all possible light conditions.

Figure 2:
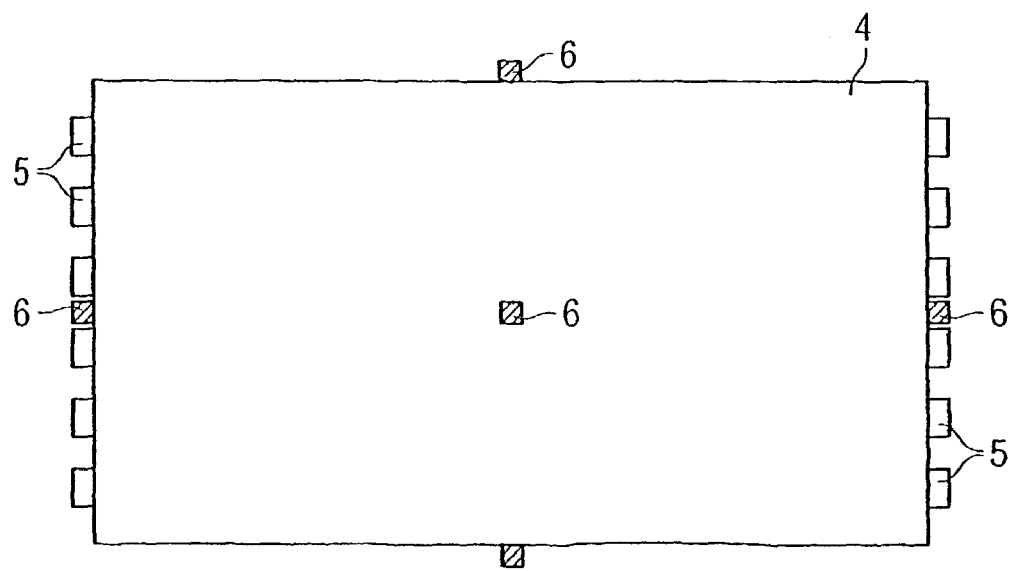
FIG. 2 shows a view of the light guide of FIG. 1, in which possible positions for an optoelectronic component are shown.

If transmissive LCDs are used, the intensity of the backlighting 5 must be increased with strong surrounding light impinging on the LC display. With diminishing surrounding light, the backlighting is dimmed, in order to reduce energy consumption and not dazzle the viewer. Favorable positions for an optoelectronic component 6 or several components 6 are shown in FIG. 2. The component 6 or sensor is arranged on a surface of the fiber-optic light guide 4. The sensor can be fastened laterally to the fiber-optic light guide 4 and parallel to the radiation axis of light source 5. Positioning of the component or components 6 in the direct beam path of the surrounding light is also shown. The light source 5 consists of a number of light diodes (LED).

Figure 3:
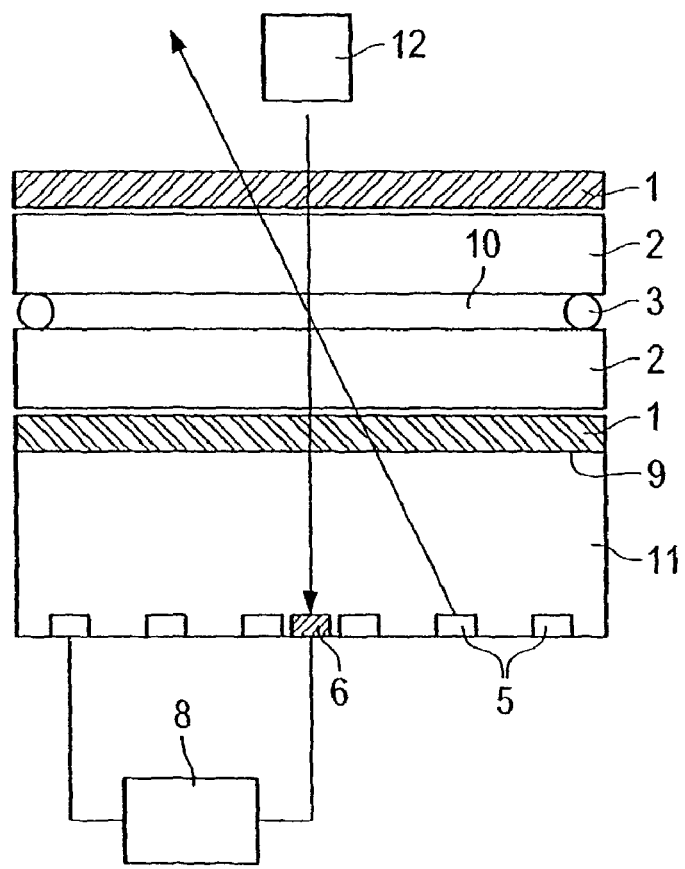
FIG. 3 shows a section through a transflective LC display with a light box as reflector.

FIG. 3 shows an optoelectronic component 6 or sensor that is arranged centrally on a reflector 11. The optoelectronic component 6 receives data from an external electrical device 12 and sends data to it. The electrical device can be a remote control, a mobile telephone, a portable computer, a pocket computer or the like.

The reflector 11 is a light box that serves to distribute the light originating from light source 5 as uniformly as possible under the surface of the display. The light source 5, which is a number of LEDs, and the sensor are arranged perpendicular to glass substrates 2.

Figure 4:
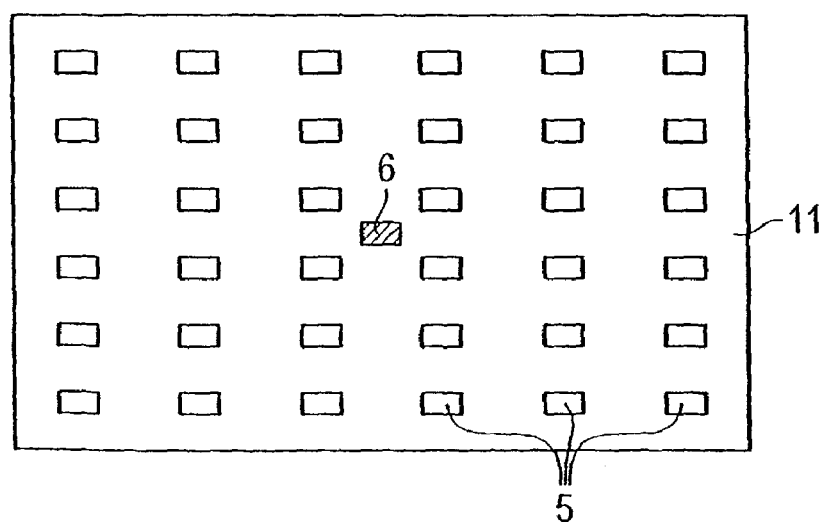
FIG. 4 shows a view of the light box of FIG. 3, in which possible positions of the component are depicted further.

The arrangement of light source 5, consisting of a number of light diodes, and the optoelectronic component 6 on reflector 11, is shown particularly clearly in FIG. 4.

Figure 5:
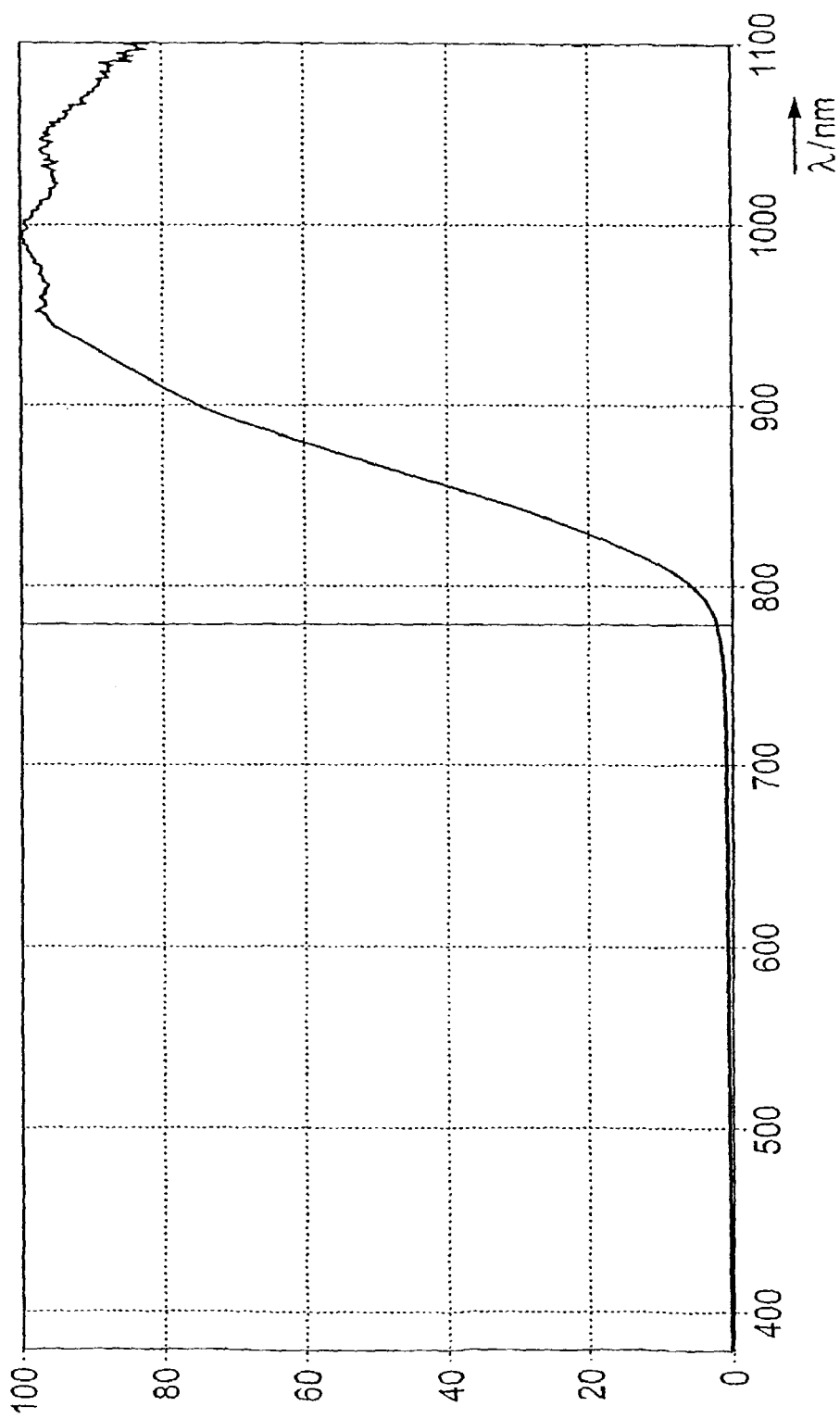
FIG. 5 shows a spectrum measured by a negative mode LC display, in which no segments are passed through (dark-switched)

FIG. 5 shows a radiation spectrum that was measured with a sensor arranged behind the liquid crystal layer, i.e., a sensor covered by the liquid crystal layer relative to the surrounding light. The measurement occurred with the light source disengaged on a negative mode display, in which none of its segments is passed through.

The intensity of the measured radiation impinging through the liquid crystal layer is stated in percent via the wavelength λ. It is found for the described state that the radiation impinging on the display is only attenuated in the ultraviolet region and in the region of visible light, i.e., to a wavelength of about 800 nm.

Figure 6:
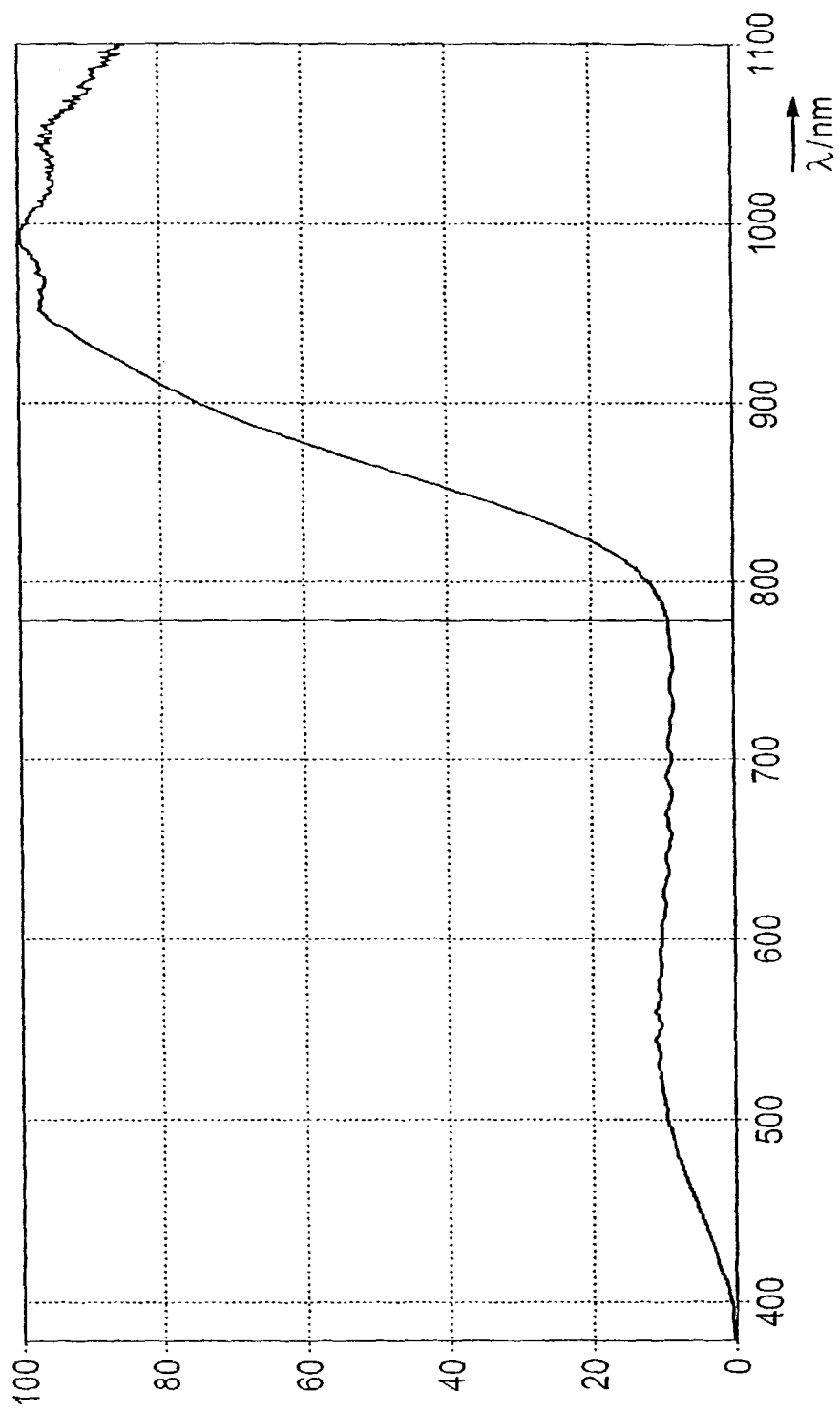
FIG. 6 shows a spectrum measured by a negative mode LC display, when all segments of the display are passed through (bright-switched).

FIG. 6 shows the same measurement as in FIG. 5 for the state in which all segments are passed through. The method of action of the LCDs is apparent. Light in the visible region, except for the fraction lost in the pole filters and through losses, are passed through. From a wavelength of about 850 nm, no noticeable difference can be seen between the two states shown in FIGS. 5 and 6. From about 900 nm to about 1100 nm, no noticeable attenuation of the incident radiation occurs.

Distortion of a measurement result is therefore ruled out from a wavelength of at least 850 nm. A particularly suitable measurement range for the sensor extends in the region from 900 nm to 1100 nm, owing to the low attenuation caused by the display.

If a light source with a narrow band spectrum is used for backlighting of the display, the light is essentially emitted only in a spectrum that lies outside of the measurement range of the sensor and a filter to filter out the light of the light source can be dispensed with. When infrared sensors are used in conjunction with an LED light source, no filter is therefore regularly required.

Such infrared sensors are also suitable for receiving of signals that are emitted by an electronic device, in order to create a data connection with a device electrically connected to the display. The control device then serves to convert the received signals into their base band. In addition to the sensor for receiving signals, a light or infrared sensor can also be arranged behind the liquid crystal layer. A data transmission protocol to an external device with transmitter and receiver can be designed.

The invention claimed is:

1. A liquid crystal display comprising:
   front and back glass substrates having a liquid crystal layer sealed therebetween,
   a light guide positioned behind the back glass substrate and running substantially the entire length of said substrate,
   a reflector positioned behind the light guide and running the entire length of the light guide, said reflector reflecting light through said liquid crystal layer in a first direction;
   a light source located adjacent to a first side of the light guide not underneath the back substrate, said light source emitting light in a second direction perpendicular to said first direction, and
   an optoelectric component located adjacent to a second side of the light guide, said component located directly underneath the back glass substrate and not in contact with the back substrate, said optoelectric component detecting light emitted in a direction perpendicular to said first direction,
   wherein the light source emits only part of the spectrum, and the optoelectronic component is aligned to that spectrum that is not emitted by the light source.

2. LC display according to claim 1, further comprising a control device connected to the optoelectronic component that controls the power of the light source as a function of the light intensity of the surrounding light impinging on the optoelectronic component.

3. LC display according to claim 2, wherein the control device corrects the intensity measured by the optoelectronic component with a value determined from control of the light source.

4. LC display according to claim 1, further comprising a filter for the light source that filters out the spectrum, for which the optoelectronic component is designed.

5. LC display according to claim 1, wherein the optoelectronic component is selected from the group consisting of an infrared sensor and an infrared transmitter for data communication with an external device.

6. LC display according to claim 1, wherein the optoelectronic component is designed for operation in the non-visible spectral region.

7. LC display according to claim 1, wherein the optoelectronic component is designed for operation of the spectral region between 900 and 1100 nm.

8. LC display according to claim 1, wherein the LC display is a transflective display.

9. LC display according to claim 1, wherein the LC display is a transmissive display.

10. LC display according to claim 1, wherein the optoelectronic component is arranged on one surface of the light guide.

11. LC display according to claim 1, wherein the optoelectronic component is arranged parallel to the light source.

* * * * *